US007610338B2

(12) United States Patent
Ueda

(10) Patent No.: US 7,610,338 B2
(45) Date of Patent: Oct. 27, 2009

(54) COMMUNICATION CONTENTS CERTIFICATION SYSTEM, COMMUNICATION CONTENTS CERTIFICATION APPARATUS, COMMUNICATION CONTENTS CERTIFICATION METHOD, AND RECORDING MEDIUM

(75) Inventor: Satoru Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 856 days.

(21) Appl. No.: 09/819,244

(22) Filed: Mar. 28, 2001

(65) Prior Publication Data

US 2002/0016822 A1 Feb. 7, 2002

(30) Foreign Application Priority Data

Mar. 31, 2000 (JP) ............................. 2000-098075

(51) Int. Cl.
*G06F 15/16* (2006.01)
*G06F 17/30* (2006.01)
(52) U.S. Cl. ............................. 709/206; 726/26; 726/27
(58) Field of Classification Search ......... 709/204–207, 709/223; 705/80; 726/26, 27
See application file for complete search history.

(56) References Cited

U.S. PATENT DOCUMENTS

| 5,956,154 | A  | * | 9/1999  | Cairo ........................ 358/434 |
| 6,115,735 | A  | * | 9/2000  | Saito ........................ 709/200 |
| 6,246,991 | B1 | * | 6/2001  | Abe et al. .................... 705/1 |
| 6,263,436 | B1 | * | 7/2001  | Franklin et al. ............. 713/167 |
| 6,289,374 | B1 | * | 9/2001  | Saito ........................ 709/206 |
| 6,314,454 | B1 | * | 11/2001 | Wang et al. ................. 709/206 |
| 6,327,656 | B2 | * | 12/2001 | Zabetian .................... 713/176 |
| 6,594,693 | B1 | * | 7/2003  | Borwankar ................. 709/219 |
| 6,640,301 | B1 | * | 10/2003 | Ng ............................ 713/156 |
| 6,769,012 | B1 | * | 7/2004  | Liu et al. ................... 709/204 |
| 2001/0027523 | A1 | * | 10/2001 | Wakino .................... 713/200 |
| 2002/0046250 | A1 | * | 4/2002  | Nassiri ..................... 709/206 |
| 2002/0091780 | A1 | * | 7/2002  | Ohta et al. ................. 709/206 |

OTHER PUBLICATIONS

Bruce Schneier and James Riordan, "A Certified Email Protocol", Dec. 1998, 13th Annual Computer Security Applications Conference, pp. 100-106.*

* cited by examiner

*Primary Examiner*—Kevin Bates
*Assistant Examiner*—Aaron Strange
(74) *Attorney, Agent, or Firm*—Frommer Lawrence & Haug LLP; William S. Frommer; Thomas F. Presson

(57) ABSTRACT

The contents of a communicated electronic mail are certificated, and the certification of a transaction contents carried out by the electronic mail is sufficiently secured. A transmitted electronic mail is transmitted to a destination by way of the communication contents certification apparatus, and the transmitted electronic mail is stored in a communication contents storage means when it is transmitted by means of the communication contents certification apparatus.

5 Claims, 3 Drawing Sheets

COMMUNICATION CONTENTS CERTIFICATION SYSTEM, COMMUNICATION CONTENTS CERTIFICATION APPARATUS, COMMUNICATION CONTENTS CERTIFICATION METHOD, AND RECORDING MEDIUM

BACKGROUND OF THE INVENTION

1. Field of the Invention

This invention relates to a communication contents certification system and a communication contents certification method that are used for certificating the communication contents and a computer-readable recording medium that stores a program for performing such function implemented on a computer, and more particularly relates to a communication certification system and a communication contents certification method used for certificating the contents of an electronic mail communicated through a telecommunication line and a computer readable-recording medium that stores a program for performing such function implemented on a computer.

2. Description of the Related Art

Recently, with development of the telecommunication line such as Internet, the information transmission by electric mail such as E-mail or the like has been used popularly. The information transmission by electronic mail is used not only for communication of personal documents between communication parties but also for electronic commerce, and it is expected that the information transmission by use of such electronic mail will be used further widely in various fields.

For example, with recent popularization of home digital video cameras and image editing apparatus, anyone can take and edit the high quality picture. The contents prepared as described hereinabove attached to an electronic mail are transmitted to a contents creating company, and the contents creating company commercializes the contents transmitted as described hereinabove. It is expected that such type of commercialization of the contents will be popularized in the future.

In the case that an electronic mail is used for commercial contract between parties, it is required to certificate the contents of the electronic mail communicated between the parties. For example, Japanese Published Unexamined Patent Application No. Hei 11-234330 discloses a method for contents certification in which the contents of an electronic mail transmitted from a party are stored in a memory apparatus and the contents are taken out from the memory apparatus to certificate the process of negotiation for making the commercial contract.

Furthermore, Japanese Published Unexamined Patent Application No. Hei 11-261549 discloses a method in which a mediator is assigned between the one party and the other party, the contents of an electronic mail are stored in a memory apparatus held by the mediator so that the electronic mail transmitted through the mediator is regarded as the mail with certificated contents.

Furthermore, Japanese Published Unexamined Patent Application No. Hei 11-340965 discloses a method for certificated reception in which a key used for opening a corresponding electronic mail is prepared for every electronic mail, the key is registered in a memory apparatus, and a party who takes an access to the memory apparatus to open the received electronic mail is regarded as a party who has read the electronic mail surely.

However, in the case of conventional electronic mail communication, because only the communication terminals of the parties who have communicated the electronic mail can store the transmitted electronic mail, the objectivity of the communicated electronic mail contents cannot be secured. In the case that the electronic mail is used commercially, the objectivity of the transaction contents cannot be secured as a sufficient certification. This is a problem of the conventional method. Such a problem is particularly remarkable in the case that the difference in power between both parties is significant.

For example, in the above-mentioned Japanese Published Unexamined Patent Application No. Hei 11-234330, Japanese Published Unexamined Patent Application No. Hei 11-261549, and Japanese Published Unexamined Patent Application No. Hei 11-340965, an electronic mail communicated between both parties is stored in a memory apparatus surely and the electronic mail may be used as the certification of contents later. However, because there is no mediator who is a law expert involved in the bargaining transaction in these inventions, both parties who are not law experts communicate an electronic mail and consider the result of communication as the certification of the contract, as the result it is not evitable that the contract is involved in various problems such as fraud.

SUMMARY OF THE INVENTION

The present invention has been accomplished in view of such problems, it is an object of the present invention to provide a communication contents certification system used for certificating the contents of a communicated electronic mail and for sufficiently securing the certification of transaction contents that has been carried out by use of the electronic mail.

Furthermore, another object of the present invention is to provide a communication contents certification method used for certificating the contents of a communicated electronic mail, and for sufficiently securing the certification of transaction contents that has been carried out by use of the electronic mail.

Furthermore, it is another object of the present invention to provide a computer-readable recording medium that stores a program implemented on a computer having a function for certificating the contents of a communicated electronic mail and for sufficiently securing the certification of transaction contents that has been carried out by use of the electronic mail.

To solve the above-mentioned problem, the present invention provides a communication contents certification system for certificating the contents of an electronic mail communicated between party communication terminals and attorney communication terminals through a telecommunication line, comprising a communication contents certification apparatus having communication contents receiving means for receiving the electronic mail, communication contents storage means for storing the contents of the electronic mail received by the communication contents receiving means, and communication contents transmission means for transmitting the electronic mail whose contents are stored by the communication contents storage means; a first party communication terminal for communicating the electronic mail with the communication contents certification apparatus; a second party communication terminal for communicating the electronic mail with the communication contents certification apparatus; a first attorney communication terminal for communicating the electronic mail with the first party by way of the communication contents certification apparatus concerning the contents of the electronic mail communicated between the first party communication terminal and the second party communication terminal; a second attorney communication terminal for communicating the electronic mail with the second party by way of the communication contents certification apparatus concerning the contents of the electronic mail communicated between the second party communication terminal and the first party communication terminal; and charging means for performing charge processing to the first and second parties and the first and second attorneys for use of the communication contents certification apparatus.

Herein, the first party communication terminal transmits the electronic mail, the communication contents receiving means receives the electronic mail transmitted from the first party communication terminal, the communication contents storage means stores the contents of the electronic mail received by the communication contents receiving means, and communication contents transmission means transmits the electronic mail having the contents stored in the communication contents storage means, and the second party communication terminal receives the electronic mail transmitted from the communication contents transmission means.

Furthermore, the present invention provides a communication contents certification method for certificating the contents of an electronic mail communicated between party communication terminals and attorney communication terminals through a telecommunication line wherein communication contents certification means that is capable of communication with a first party communication terminal, a second party communication terminal, a first attorney communication terminal, and a second attorney communication terminal by electronic mail and capable of storing the contents of the electronic mail for every communication is used, 1) the electronic mail destined for the first attorney communication terminal transmitted from the first party communication terminal is received by means of the first attorney communication terminal by way of the communication contents certification apparatus, 2) the electronic mail destined for the first party communication terminal transmitted from the first attorney communication terminal is received by means of the first party communication terminal by way of the communication contents certification apparatus, 3) the electronic mail destined for the second party communication terminal transmitted from the first party communication terminal is received by means of the second party communication terminal by way of the communication contents certification apparatus, 4) the electronic mail destined for the second attorney communication terminal transmitted from the second party communication terminal is received by means of the second attorney communication terminal by way of the communication contents certification apparatus, and 5) the electronic mail destined for the first party communication terminal transmitted from the second attorney communication terminal is received by means of the first party communication terminal by way of the communication contents certification apparatus.

By using the above-mentioned method, because a party who is not a law expert is consulted by an attorney, it is possible for the party to make a contract correctly and effectively, and it is possible that the contents of a communicated electronic mail are certificated objectively.

Furthermore, the present invention provides a computer-readable information recording medium, that is an information recording medium used for a communication contents certification apparatus used for certificating the contents of an electronic mail communicated between party communication terminals and attorney communication terminals through a telecommunication line, having a program to perform a function wherein 1) the electronic mail destined for the first attorney communication terminal transmitted from the first party communication terminal is stored in the communication contents certification apparatus and also transmitted to the first attorney communication terminal, 2) the electronic mail destined for the first party communication terminal transmitted from the first attorney communication terminal is stored in the communication contents certification apparatus and also transmitted to the first party communication terminal, 3) the electronic mail destined for the second party communication terminal transmitted from the first party communication terminal is stored in the communication contents certification apparatus and also transmitted to the second party communication terminal, 4) the electronic mail destined for the second attorney communication terminal transmitted from the second party communication terminal is stored in the communication contents certification apparatus and also transmitted to the second attorney communication terminal, and 5) the electronic mail destined for the first party communication terminal transmitted from the second attorney communication terminal is stored in the communication contents certification apparatus and also transmitted to the first party communication terminal.

DETAILED DESCRIPTION OF THE PREFERRED EMBODIMENTS

Embodiments of the present invention will be described hereinafter in detail with reference to the drawings.

Figure 1:
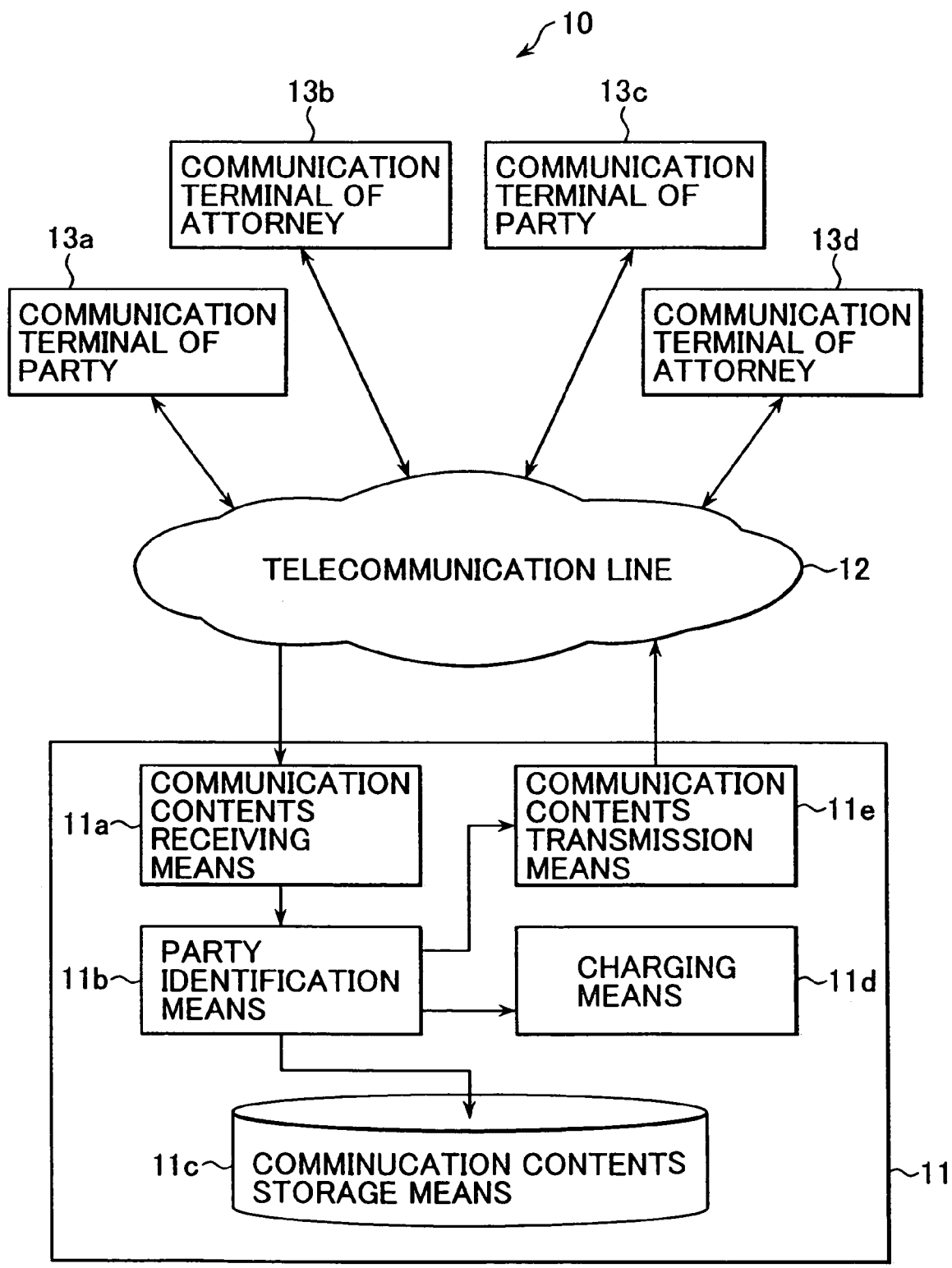
FIG. 1 is a structural diagram illustrating the structure of a communication contents certification system.

FIG. 1 is a structural diagram illustrating a communication contents certification system 10 in accordance with the present invention.

The communication contents certification system 10 comprises party communication terminals 13a and 13c that are a first communication terminal for transmitting an electronic mail or a second communication terminal for receiving an electronic mail, attorney communication terminals 13b and 13d, a telecommunication line 12 such as the Internet or the like for communicating an electronic mail or the like, and a communication contents certification apparatus 11 for certificating the contents of an electronic mail communicated through the telecommunication line.

The party communication terminals 13a and 13b are communication terminals of personal computers or the like owned by communication party who communicates an electronic mail for commercial transaction. The attorney communication terminal 13b is a communication terminal owned by an attorney for the party who owns the party communication terminal 13a, and on the other hand the attorney communication terminal 13d is a communication terminal owned by an attorney for the party who owns the party communication terminal 13c who gives an advise to the party from the stand point of a law expert.

The communication contents certification apparatus 11 for certification that is owned and managed by a third party other than the above-mentioned communication parties and attorneys comprises communication contents receiving means 11a for receiving an electronic mail transmitted from the first communication terminal, party identification means 11b for identifying a sender of a transmitted electronic mail, communication contents storage means 11c for storing the contents of an electronic mail received by the communication contents receiving means 11a, charging means 11d for processing the charge for use of the communication contents certification apparatus, and communication contents transmission means 11e for transmitting the contents of an electronic mail stored by the communication contents storage means 11c.

The party communication terminals 13a and 13c and attorney communication terminals 13b and 13d are electrically connected to the telecommunication line 12 so as to communicate each other, and the communication contents certification apparatus 11 is electrically connected communicatively to the telecommunication line 12 by means of the communication contents receiving means 11a and the communication contents transmission means 11e.

Next, the operation of the communication contents certification system 10 will be described with reference to FIG. 1. An exemplary case in which the owner of the party communication terminal 13a (referred to as first communication party herein under) transmits an electronic mail for commercial transaction to the owner of the party communication terminal 13c (referred to as second communication party) will be described herein under.

In using the communication contents certification system 10, at first the first communication party, the second communication party, and their attorneys make a contract for using the communication contents certification system 10, and receive the issue of personal ID and password that are necessary for personal authentication. The personal ID and password issued as described hereinabove are hold by the first communication party or the like who made the contract for using the communication contents certification system 10, and stored in the recording apparatus of the communication contents certification apparatus 11 not shown in the drawing.

Figure 2:
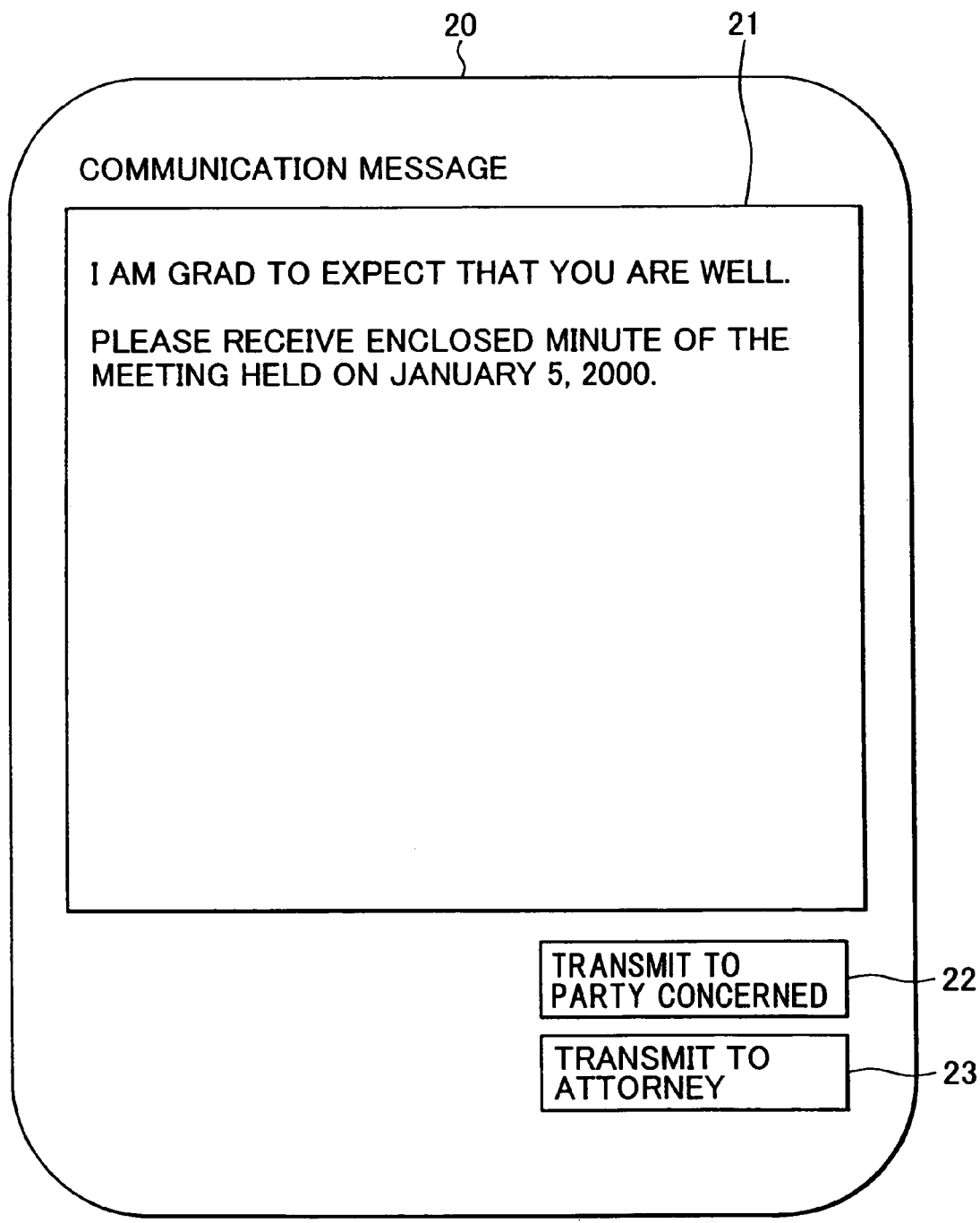
FIG. 2 is a diagram showing a transmission message GUI picture displayed on the screen of a party communication terminal when a transmission message is entered.

Next, the first communication party who wants to transmit an electronic mail by use of the communication certification system 10 at first enters a transmission message at the party communication terminal 13a. FIG. 2 is a diagram for showing a transmission GUI picture 20 displayed on the screen of the party communication terminal 13a when the transmission message as shown herein is entered. The transmission message GUI picture 20 comprises a message display section 21 for displaying a transmission message, a transmission button 22 that is clicked when a transmission message is transmitted to the party communication terminal 13c, and a transmission button 23 that is clicked when the transmission message is transmitted to the attorney communication terminal 13b. The transmission message is entered at the party communication terminal 13a when the first communication party enters characters (transmission message text) from a keyboard or the like of the party communication terminal 13a while viewing the message display section 21.

When the input of the transmission message is completed, the first communication party asks the attorney to confirm the contents of the prepared transmission message next. For asking the attorney to confirm the contents of the transmission message, the first communication party transmits the prepared transmission message as an electronic mail by clicking the transmission button 23 of the transmission message screen 20. The electronic mail of the transmission message transmitted from the party communication terminal 13a is received at first by the communication contents receiving means 11a of the communication contents certification apparatus 11 through the telecommunication line 12. The electronic mail of the transmission message received by the communication contents receiving means 11a is transmitted to the party identification means 11b, and the party identification means 11b checks whether the sender of the received electronic mail is exactly the contractor or not by use of the personal ID and password of the using contract stored in the recording apparatus not shown in the drawing.

Herein, if the sender of the electronic mail is determined to be exactly the contractor, then the information of the contract checked by the party identification means 11b is transmitted to the charging means 11d, and the charging means 11d carries out the charge processing to the user based on the information. Furthermore, the contents of the electronic mail are stored in the communication contents storage means 11c as the communication history, and the electronic mail that has been transmitted by the communication contents transmission means 11e from the communication contents transmission means 11e is received by means of the attorney communication terminal 13b through the telecommunication line 12.

The electronic mail received by means of the attorney communication terminal 13b is displayed on the attorney communication terminal 13b as a received message, and the attorney for the first communication party views the displayed received message and transmits a comment on the content. The transmitted electronic mail is received by the communication contents receiving means 11a of the communication contents certification apparatus 11 through the telecommunication line 12 as in the case described hereinabove, subjected to authentication for genuineness of the principal by the party identification means 11b, stored in the communication contents storage means 11c, and transmitted by the communication contents transmission means 11e. Thereafter, the electric mail is received by means of the party communication terminal 13a through the telecommunication line 12, and the comment transmitted by electronic mail is displayed on the party communication terminal 13a.

Figure 3:
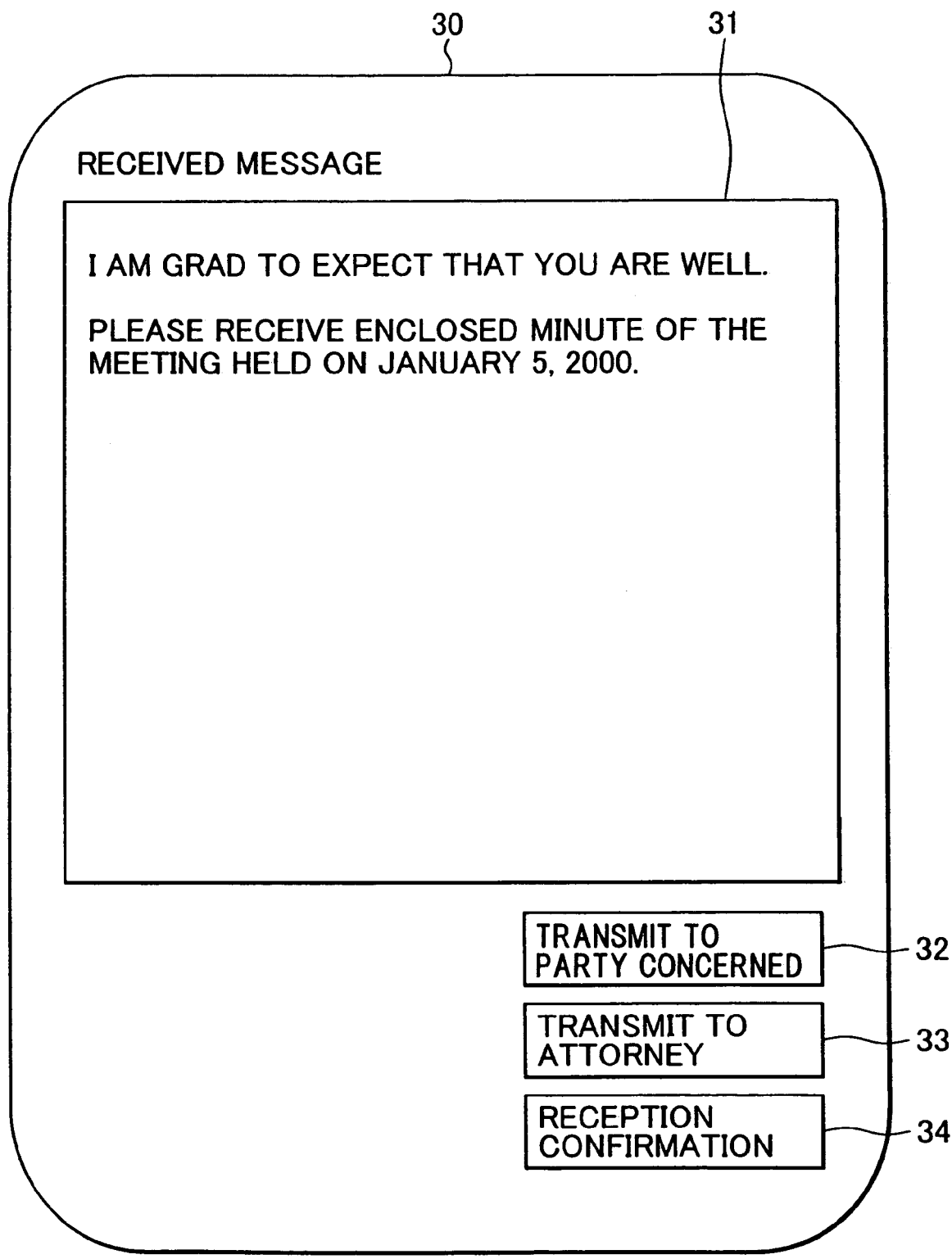
FIG. 3 is a diagram showing a received message GUI picture displayed on the screen of a party communication terminal.

The first communication party who has viewed the comment transmitted from the attorney displayed on the party communication terminal 13a prepares a final transmission message with reference to the comment, and then clicks the transmission button 22 on the transmission message screen 20 to transmit the electronic mail of the transmission message. The transmitted electronic mail is received by the communication contents receiving means 11a of the communication contents certification apparatus 11 through the telecommunication line 12 as in the above-mentioned case, subjected to authentication for genuineness of the principal by the party identification means 11b, stored in the communication contents storage means 11c, and transmitted by the communication contents transmission means 11e. Thereafter, the electronic mail is received by the party communication means 13c through the telecommunication line 12, and the contents of the electronic mail are displayed on the party communication terminal 13c as a received message. FIG. 3 is a diagram showing the received message screen 30 displayed on the party communication terminal 13c.

The received message screen 30 is composed of a message display section 31 for displaying a received message, a transmission button 32 that is clicked when a prepared message is transmitted to the party communication terminal 13a, a transmission button 33 that is clicked when the prepared message is transmitted to the attorney communication terminal 13d, and a reception confirmation button 34 for confirming that an electronic mail is received.

The second communication party who has viewed the received message displayed on the message display section 31 clicks the reception confirmation button 34 for indicating that the electric mail is received at first. When the reception confirmation button 34 is clicked, the party communication terminal 13c transmits the reception confirmation information, and the transmitted reception confirmation signal is received by the communication contents receiving means 11a of the communication contents certification apparatus through the telecommunication line 12 as in the case of the above-mentioned electronic mail, subjected to authentication for genuineness of the principal by the party identification means 11b, stored in the communication contents storage means 11c, and transmitted by the communication contents transmission means 11e. Thereafter, the electronic mail is received by the party communication means 13a through the telecommunication line 12. Thereby, the first communication party can be aware that the transmitted electronic mail has received by the second communication party.

Furthermore, when the second communication party want to send a reply message to the received message by electronic mail, at first a reply message is prepared, the transmission button 33 is clicked so that the electronic mail of the prepared reply message is transmitted to the attorney communication terminal 13d by way of the communication contents certification apparatus 11 as in the above-mentioned case that the first communication party prepares the transmission message. The attorney for the second communication party transmits an electronic mail of a comment on the electronic mail of the reply message to the party communication terminal 13c by way of the communication contents certification apparatus 11. Next, the second communication party prepares a final reply message with reference to the comment given by the attorney, and transmits an electronic mail of the prepared final reply message to the party communication terminal 13a by way of the communication contents certification apparatus 11. The communication history of the electronic mail concerning the reply message is also stored in the communication storage means 11c as in the above-mentioned case.

As described hereinabove, because an electronic mail transmitted from the party communication terminal 13a is stored in the communication contents storage means 11c of the communication contents certification apparatus 11 and also transmitted to the party communication terminal 13c in the present embodiment, the contents of the electronic mail communicated between both communication parties can be stored by the third party organization who is not the communication parties, as the result it is possible to certificate the contents of the communicated electronic mail and to sufficiently secure the certification of the transaction contents carried out by electronic mail.

The above-mentioned processing function is realized by a computer. In this case, the processing contents of the function that the communication contents certification apparatus 11 should have are described in a program recorded in a computer-readable recording medium. The program is executed on a computer to thereby realize the above-mentioned processing on the computer. A magnetic recording apparatus or semiconductor memory may be used as the computer-readable recording medium. For distribution in the market, a potable recording medium such as CD-ROM (Compact Disk Read Only Memory) or floppy disk in which the program is stored is distributed, or the program that is stored in a memory apparatus of a computer connected through a network may be transferred to another computer through the network. When the program is executed on a computer, the program is stored in a hard disk or the like in the computer and loaded on the main memory for execution.

The above-mentioned electronic mail and the reception confirmation information that have been encrypted may be transmitted. Thereby, it is possible to prevent invalid access of a third party.

Furthermore, the charging means lid may charge differently depending on the storage organization of communication history, storage method, frequency of backup, and data storage size for storing in the communication contents storage means 11c.

As described hereinbefore, because an electronic mail transmitted from the first communication terminal is stored in the communication contents storage means of the communication contents certification apparatus and also transmitted to the second communication terminal in the present invention, it is possible that the third party organization stores the contents of the communicated electronic mail, the contents of each electronic mail are consulted by the attorney for every communication, the contents of the communicated electronic mail are certificated, and the certification of the transaction contents carried out by electronic mail is sufficiently secured, and the fraud problem is prevented.

What is claimed is:

1. A communication contents certification method for certifying contents of an electronic mail communicated between two or more party communication terminals and two or more attorney communication terminals through a network, the communication contents certification method comprising:

storing, at a contents certification apparatus, a personal ID and password, issued to each party and utilized for a particular transaction between a first party and a second party transmitting, from a communication terminal of the first party, an electronic mail to the contents certification apparatus;

confirming the first party is authentic, at the contents certification apparatus, based on the personal ID and password of the first party;

transmitting, from the contents certification apparatus, to a communication terminal of a first attorney, the electronic mail;

adding first comment data to the email at the communication terminal of the first attorney;

transmitting, from the communication terminal of the first attorney to the contents certification apparatus, the email with the first comment data;

confirming the first attorney is authentic, at the contents certification apparatus, based on the personal ID and password of the first attorney;

transmitting, from the contents certification apparatus, the email with the first comment data, to the communication terminal of the first party;

inserting first message data, at the communication terminal of the first party, in the email, the first message data being based on the first comment data provided by the first attorney;

transmitting, from a communication terminal of the first party, the electronic mail with the first message data, to the contents certification apparatus;

confirming the first party is authentic, at the contents certification apparatus, based on the personal ID and password of the first party;

transmitting, from the contents communication apparatus, the electronic mail with the first message data, to a communication terminal of the second party;

adding second message data to the email at the communication terminal of the second party;

transmitting, from the communication terminal of the second party to the contents certification apparatus, the email with the second message data;

confirming the second party is authentic, at the contents certification apparatus, based on the personal ID and password of the second party;

transmitting, from the contents certification apparatus, the email with the second message data, to a communication terminal of a second attorney;

inserting second comment data, at the communication terminal of the second attorney, in the email based on the second message data;

transmitting, from a communication terminal of the second attorney, the electronic mail with the second comment data, to the contents certification apparatus;

confirming the second attorney is authentic, at the contents certification apparatus, based on the personal ID and password of the second attorney;

transmitting, from the certification apparatus to the communication terminal of the second party, the electronic mail including the second comment data;

transmitting, from the communication terminal of the second party, the electronic mail including the second comment data, to the contents certification apparatus;

confirming the second party is authentic, at the contents certification apparatus, based on the personal ID and password of the second party;

transmitting, from the certification apparatus to the communication terminal of the first party, the electronic mail including the second comment data.

2. The communication contents certification method as claimed in claim 1, wherein the communication terminal of the first party includes a GUI (Graphic User Interface) having a party button display section for selecting electronic mail communication with the communication terminal of the second party and an attorney button display section for selecting electronic mail communication with the communication terminal of the first attorney, wherein the communication terminal of the first party is adapted to transmit the electronic mail as a function of input to the GUI.

3. The communication contents certification method as claimed in claim 1, wherein the contents of the electronic mail relate to a contract matter between the first party and the second party.

4. The communication contents certification method as claimed in claim 1, wherein the electronic mail is encrypted.

5. The communication contents certification method as claimed in claim 1, wherein the communication contents certification method further comprises:

identifying a party using the party communication terminal from which the electronic mail was transmitted.

* * * * *

UNITED STATES PATENT AND TRADEMARK OFFICE
CERTIFICATE OF CORRECTION

PATENT NO. : 7,610,338 B2
APPLICATION NO. : 09/819244
DATED : October 27, 2009
INVENTOR(S) : Satoru Ueda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1130 days.

Signed and Sealed this

Twelfth Day of October, 2010

David J. Kappos
*Director of the United States Patent and Trademark Office*